(12) United States Patent
McCann (10) Patent No.: US 9,061,664 B2
(45) Date of Patent: Jun. 23, 2015

(54) ELECTROHYDRAULIC ANTILOCK BRAKE SYSTEM FOR ARTICULATED VEHICLES

(71) Applicant: Caterpillar Inc., Peoria, IL (US)

(72) Inventor: Gerard O. McCann, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 13/718,696

(22) Filed: Dec. 18, 2012

(65) Prior Publication Data
US 2014/0167497 A1   Jun. 19, 2014

(51) Int. Cl.
 *B60T 8/24* (2006.01)
 *B60T 8/1769* (2006.01)
 *B60T 8/1764* (2006.01)

(52) U.S. Cl.
 CPC ............ *B60T 8/1769* (2013.01); *B60T 8/1764* (2013.01)

(58) Field of Classification Search
 USPC ........................... 180/197; 303/155, 186–190
 See application file for complete search history.

(56) References Cited

U.S. PATENT DOCUMENTS

| | | | |
|---|---|---|---|
| 4,668,023 A | 5/1987 | Every et al. | |
| 4,824,183 A | 4/1989 | Uchida et al. | |
| 4,893,689 A | 1/1990 | Laurich-Trost | |
| 5,754,967 A * | 5/1998 | Inoue et al. | 701/54 |
| 6,186,258 B1 * | 2/2001 | Deutschel et al. | 180/197 |
| 6,598,946 B2 * | 7/2003 | Nagae | 303/190 |
| 6,676,555 B2 * | 1/2004 | Duan | 475/231 |
| 6,830,122 B2 * | 12/2004 | Kroppe | 180/197 |
| 7,458,911 B2 * | 12/2008 | Krisher et al. | 475/86 |
| 7,562,947 B2 * | 7/2009 | Katada et al. | 303/140 |
| 2002/0014799 A1 * | 2/2002 | Nagae | 303/139 |
| 2005/0116537 A1 * | 6/2005 | Zalewski et al. | 303/139 |
| 2007/0029875 A1 * | 2/2007 | Kurosaki et al. | 303/187 |
| 2010/0161190 A1 * | 6/2010 | McCann et al. | 701/69 |
| 2012/0209484 A1 * | 8/2012 | McCann et al. | 701/69 |

* cited by examiner

*Primary Examiner* — Christopher Schwartz
(74) *Attorney, Agent, or Firm* — Miller, Matthias & Hull LLP (57) ABSTRACT

An antilock brake system for a vehicle having a front axle with right and left front brakes and at least one rear axle with right and left rear brakes is disclosed. The front axle includes a front differential with a front clutch and the rear axle includes a rear differential with a rear clutch. A controller is employed to control the brake torque applied through one or more brake valve assemblies and the controller may further shift brake torque from one wheel of an axle to the other wheel on the axle through a differential clutch valve assembly in the clutch of an open differential which forms part of the axle assembly.

20 Claims, 5 Drawing Sheets

ABS systems may allow one wheel to lock while the other wheel rotates in order to minimize the stopping distance. However,

ELECTROHYDRAULIC ANTILOCK BRAKE SYSTEM FOR ARTICULATED VEHICLES

BACKGROUND

1. Technical Field

This disclosure relates to antilock brake systems and, more specifically, to electrohydraulic antilock brake systems for articulated vehicles.

2. Description of the Related Art

Braking a vehicle in a controlled manner under adverse conditions such as rain, snow, or ice generally requires precise application of the brakes by the vehicle driver. Under these conditions, or in panic stop situations, a driver will often apply excessive brake pressure, thereby causing the wheels to lockup and slip or skid on the road surface. Wheel lockup conditions can lead to loss of directional stability and, possibly, uncontrolled vehicle spinout.

In a continuing effort to improve the operational safety of vehicles, antilock braking systems have been developed. While such systems are adapted to control the braking of each braked wheel of a vehicle, some systems have been developed for controlling the braking of only a portion of the braked wheels. Generally, antilock brake systems are electrohydraulic and include a controller and sensors for monitoring the speed of the controlled wheels to determine the deceleration of the controlled wheels. Antilock brake systems also include one or more hydraulic circuits for applying pressure to the brakes of the controlled wheels. When the brakes of the vehicle are applied and the wheel deceleration of the monitored wheels exceeds one or more of predetermined thresholds, indicating that there is wheel slippage and the wheels are approaching a lockup condition, the controller functions to control the application of hydraulic pressure through a series of valves associated with the brakes to prevent a lockup of the controlled wheels. Typically, the controller will deactivate and activate the valves to cyclically release and reapply pressure to the brakes to limit wheel slippage to a safe level while continuing to produce adequate brake torque to decelerate the vehicle as desired by the driver.

In the interest of cost reduction, ABS systems have been deployed where the number of control channels is less than the number of sensed wheels. For example, some manufacturers have explored the concept of "dual-channel" or "dual-circuit" antilock brake systems which control all rear wheel brakes with one channel of control and both front wheels with another channel of control. Dual-circuit hydraulic antilock brake systems include a pair of hydraulic brake circuits which are hydraulically independent of each other. One brake circuit is adapted to establish a braking pressure to be applied to the front wheel brake cylinders, while the other brake circuit is adapted to establish another independent braking pressure to be applied to the rear wheel brake cylinders. An example of such a dual-circuit hydraulic antilock brake system is disclosed in U.S. Pat. No. 4,824,183.

However, prior art ABS systems that minimize the number of control circuits may introduce problems. For example, the surfaces on which the left and right wheels are rotating may be different, e.g., one wheel may be rotating on ice patch and the other wheel may be rotating on dry asphalt. Some ABS systems may allow one wheel to lock while the other wheel rotates in order to minimize the stopping distance. However, directional control is compromised, especially if one front wheel is locked while the other front wheel is rotating. The tire that is locked is also subject to unnecessary wear and, for off-highway machines, the locked tire may be damaged or destroyed if it is dragged over a sharp object. Other ABS systems respond by not permitting the one wheel to lock, but the braking torque applied to both wheels, including the rotating wheel, is reduced. Obviously, this strategy compromises stopping distance. Yet other ABS systems compromise between these two concepts and allow one of the wheels to lock for short periods of time before reducing the braking torque applied to both wheels for short period of time before the braking torque is increased again, which may cause one of the wheels to lock again. The process is then repeated. As a result, directional control and stopping distance may be compromised.

Thus, new ABS systems are needed that limit the number of control circuits thereby reducing costs but also avoid locking of the braked wheels for improved control and also limit brake torque reductions to improve stopping distances.

SUMMARY OF THE DISCLOSURE

In one aspect, an antilock brake system for a vehicle is disclosed. The vehicle includes a front axle with right and left front brakes and at least a first rear axle with first right and left rear brakes. The front axle may include a front differential with a front clutch. The first rear axle may include a first rear differential with a first rear clutch. The system may include a controller that may be linked to the following components: a front axle differential clutch valve assembly; a first rear axle differential clutch valve assembly and a brake valve assembly. The brake valve assembly may be in communication with the right and left front brakes and the right and left rear brakes. The front axle differential clutch valve assembly may be in communication with the front clutch while the first rear axle differential clutch valve assembly may be in communication with the first rear clutch. The brake valve assembly, front axle differential clutch valve assembly and first rear axle differential clutch valve assembly may be in communication with a source of pressurized hydraulic fluid.

Another antilock brake system is disclosed for a vehicle that has a front axle with right and left front brakes and a first rear axle with right and left rear brakes. The front axle may include a front differential with a front clutch and the first rear axle may include a first rear differential with a first rear clutch. The system may include a controller linked to the following components: an actuator of a normally closed first brake pilot valve, an actuator of a normally closed front axle differential clutch pilot valve; and an actuator of a normally closed first rear axle differential clutch pilot valve. The first brake pilot valve may be in communication with an actuator of a normally closed first brake control valve. The front axle differential clutch pilot valve may be in communication with an actuator of a normally closed front axle differential clutch control valve. The first rear axle differential clutch pilot valve may be in communication with an actuator of a normally closed first rear axle differential control valve. The first brake control valve may be in communication with the right and left front brakes and, optionally, the right and left rear brakes. The front axle differential control valve may be in communication with the front clutch and the first rear axle differential clutch control valve may be in communication with the first rear clutch. The first brake pilot valve, first brake control valve, front axle differential clutch pilot valve, front axle differential clutch control valve, first rear axle differential clutch pilot valve and first rear axle differential clutch control valve may be in communication with a source of pressurized hydraulic fluid.

In another aspect, a method of braking a vehicle is disclosed. The method may include sending a brake signal to a controller and sending a signal from the controller to a brake valve assembly to provide communication from a pressurized fluid reservoir through the brake valve assembly to right and left brakes of at least one axle. The method may further include sending pressurized fluid from the reservoir to the right and left brakes of said axle. Further, if one of the brakes approaches a locked condition, the method may further include sending the signal from the controller to the brake valve assembly to reduce communication from the reservoir to the brakes and sending a signal from the controller to an axle differential clutch valve assembly to provide communication from the reservoir to a clutch of an axle differential and transmitting torque from the brake that is approaching the locked condition to the other brake.

DETAILED DESCRIPTION OF THE PRESENTLY PREFERRED EMBODIMENTS

Figure 1:
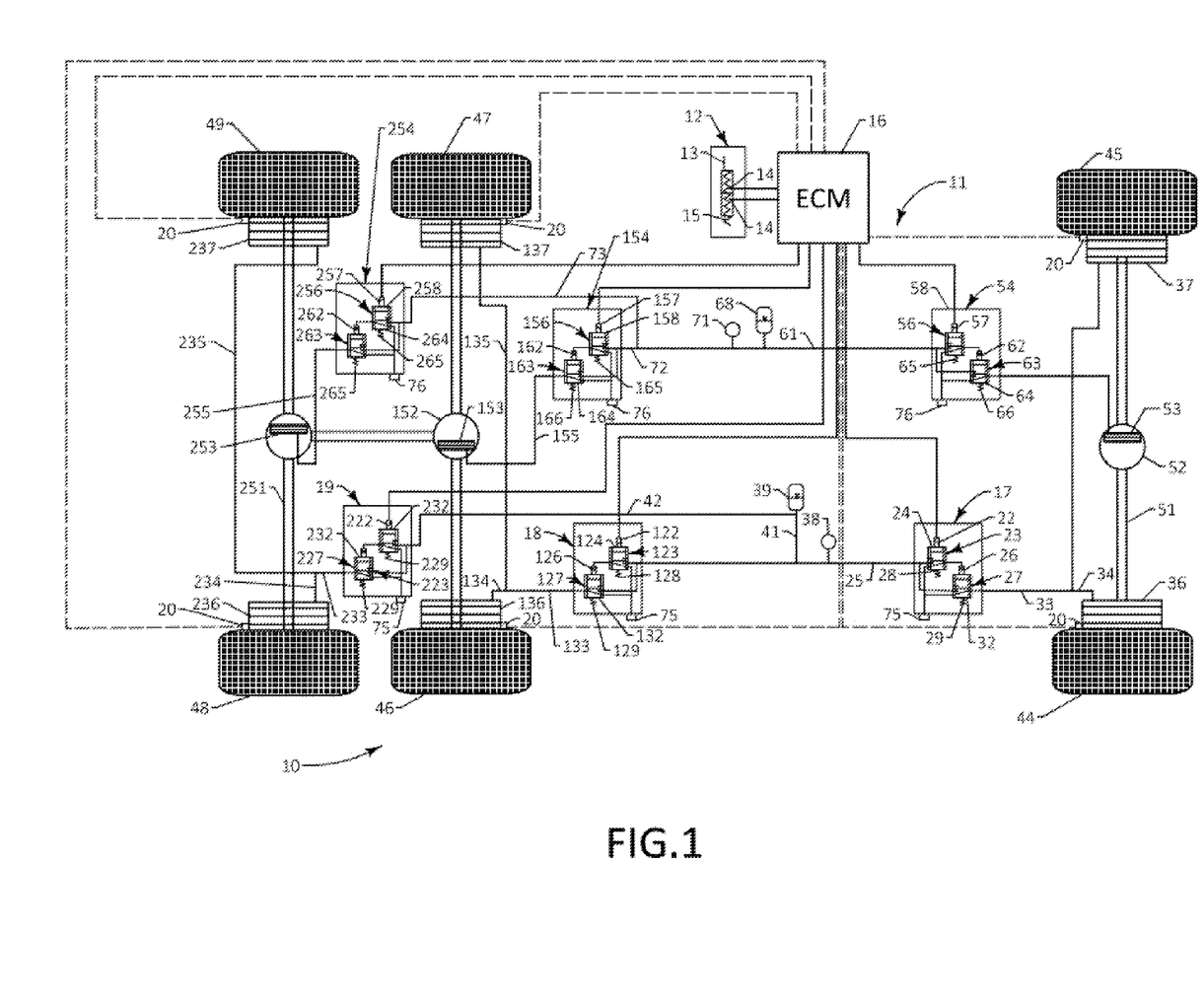
FIG. 1 schematically illustrates one disclosed electrohydraulic antilock braking system installed on a vehicle with differentials on each of the three axles, clutch control valves for each clutch of each differential and brake control valves for each axle.

Turning first to FIG. 1, a vehicle 10 is disclosed with an antilock braking system 11. The antilock braking system 11 may include a brake pedal assembly 12 that includes a brake pedal 13 and brake pedal sensors 14. The brake pedal assembly 12 also includes a biasing element 15. The brake pedal sensors 14 may be linked to a controller 16 that may be an electronic control module. The controller 16 may include a memory with a brake control algorithm stored therein. The antilock braking system 11 also includes wheel speed sensors 20, one of which is associated with each monitored wheel 44-19 (FIGS. 1-2 and 4) or 44-47 (FIG. 3).

While FIGS. 1-4 show a hydraulic arrangement based on a pure electro-hydraulic or brake by wire system where the driver's braking demand is transferred electronically to the controller 16, it is also possible for the brake demand to be transferred hydraulically from a valve linked to the brake pedal. In that case, the controller simply interrupts that signal as required. Numerous other alternatives are possible and will be known to those skilled in the art.

The controller 16 is linked to three brake valve assemblies including a front brake valve assembly 17, a first rear brake valve assembly 18, and a second rear brake valve assembly 19. Turning to the front brake valve assembly 17, the controller 16 may be linked to a solenoid 22 of a front brake pilot valve 23. As shown in FIG. 1, the front brake pilot valve 23 may be a normally closed directional proportional control valve with three ports and two extreme positions. When the controller 16 sends a signal to the solenoid 22, the spool 24 is shifted downward thereby providing communication between the pressurized fluid line 25 and the hydraulic actuator 26 of the front brake valve 27. The front brake valve 27 may be a normally closed directional proportional control valve with three ports and two extreme positions, like the front brake pilot valve 23. Both of the valves 23, 27 include biasing elements 28, 29 to maintain the valves 23, 27 in their normally closed positions.

After the front brake pilot valve 23 is opened and provides communication between the fluid line 25 and the hydraulic actuator 26 of the front brake valve 27, the spool 32 of the front brake valve 27 is shifted downward in the orientation of FIG. 1 thereby providing communication between the fluid line 25 and the front brake fluid line 33 which may be connected to a right front brake fluid line 34 and a left front brake fluid line 35. The right and left front brake fluid lines 34, 35 may be in communication with the right and left front brakes 36, 37 respectively. Pressure in the fluid line 25 may be provided by a pump 38 as well as an accumulator 39.

The first rear brake valve assembly 18 and second rear brake assembly 19 may be of the same configuration as the front brake valve assembly 17. Specifically, the controller 16 may be in communication with a solenoid 122 of a first rear brake pilot valve 123 that may also be a normally closed directional proportional control valve with three ports and two extreme positions. Upon receiving a signal from the controller 16, the solenoid 122 shifts the spool 124 downward in the orientation of FIG. 1 against the biasing element 128 thereby providing communication between the fluid line 25 and the hydraulic actuator 126 of the first rear brake control valve 127. The first rear brake control valve 127 may also be a normally closed directional proportional control valve with three ports and two extreme positions. The biasing element 129 maintains the valve 127 in its normally closed position. The hydraulic actuator 126, upon receiving pressurized fluid from the line 25 through the first rear brake pilot valve 123, shifts the spool 132 downward thereby providing communication between the fluid line 25 and the first rear brake fluid line 133. The first rear brake fluid line 133 may be in communication with the first right rear brake fluid line 134 and first left rear brake fluid line 135 that may be in communication with the first right rear brake 136 and first left rear brake 137 respectively.

The pressurized hydraulic fluid line 25 may be branched in a variety of ways such as including a line 41 that provides communication between the line 25 and the accumulator 39 and the line 41 and accumulator 39 may be in communication with the line 42 that provides communication to the second rear brake pilot valve 223. The second rear brake pilot valve 223 may also include a solenoid 222 that receives a signal from the controller 16 that results in a shifting of the spool 232 downward thereby providing communication between the line 42 and the hydraulic actuator 226 of the second rear brake control valve 227. The second rear brake pilot valve 223 and the second rear brake control valve 227 may both be normally closed directional and proportional control valves with three ports and two extreme positions as shown in FIG. 1. Both of the valves 223, 227 may include biasing elements 228 and 229 respectively to maintain them in normally closed positions. The second rear brake control valve 227 also includes a spool 232 that is shifted downward when the hydraulic actuator 226 receives pressurized fluid from the line 42 through the second rear brake pilot valve 223. When opened, the second rear brake control valve 227 provides communication to the second rear brake fluid line 233 which is in communication with the second right rear brake fluid line 234 and the second left rear brake fluid line 235. The lines 234, 235 then deliver fluid to the second right rear brake 236 and second left rear brake 237 respectively.

Thus, the antilock braking system 11 of FIG. 1 provides a controlled delivery of hydraulic fluid to all six wheels or ground engaging elements 44, 45, 46, 47, 48, 49. However, only one brake valve assembly 17, 18, 19 is provided for each axle 51, 151, 251 or each pair of wheels 44, 45; 46, 47; and 48, 49 respectively. In the event one of the wheels of a pair of wheels, for example, in the event the right front wheel 44 begins to lock while the left front wheel 45 is rotating normally during a braking operation, the disclosed antilock braking system 11 provides a means for transmitting braking torque from the nearly locked or locked wheel 44 to the normally rotating wheel 45. This function is also provided for the rear pairs of wheels 46, 47 and 48, 49.

Returning to the front wheels 44, 45, the front wheels 44, 45 are coupled together by an axle 51. The axle 51 may include an open differential 52 which may include a clutch 53. The front clutch 53 is in communication with a front axle differential clutch valve assembly 54 by way of the line 55. The front axle differential control valve assembly 54 also includes a front axle differential clutch pilot valve 56 that may include a solenoid 57 that receives signals from the controller 16. The front axle differential clutch pilot valve 56 may also be a normally closed directional and proportional control valve with three ports and two extreme positions. Upon receiving a signal from the controller 16, the solenoid 57 may shift the spool 58 downward against the biasing element 66 thereby providing communication between the fluid line 61 and the hydraulic actuator 62 of the front axle differential clutch control valve 63. Upon receiving fluid from the line 61, the actuator 62 shifts the spool 64 downward against the biasing element 66 to provide communication between the lines 61 and 55 thereby delivering pressurized hydraulic fluid to the clutch 53. The clutch 53 then may transfer torque from the wheel that is locked or approaching a locked position, e.g. the right front wheel 44, to the wheel that is rotating normally, e.g. the left front wheel 45. Both the front axle differential clutch pilot valve 56 and the front axle differential clutch control valve 63 may be normally closed directional and proportional control valves with three ports and two extreme positions. To open either valve 56 or 63, the force imposed by the biasing elements 65, 66 respectively must be overcome by the action of the solenoid 57 or hydraulic actuator 62 respectively.

The fluid line 61 is pressurized by way of the accumulator 68 and/or pump 71 which may also provide pressure to the lines 72 and 73 that lead to the first rear axle differential control valve assembly 154 and second rear axle differential control valve assembly 254 respectively. The valve assemblies 154, 254 may be of the same configuration as the front axle differential control valve assembly 54.

Specifically, the controller 16 may send a signal to the solenoid 157 of the first rear axle differential pilot valve 156 which shifts the spool 158 downward against the biasing element 165 in the orientation of FIG. 1 against the biasing element 165 thereby providing communication between the line 72 and the hydraulic actuator 162 of the first rear axle differential clutch control valve 163. The hydraulic actuator 162 shifts the spool 164 downward against the bias of the biasing element 166 thereby providing communication between the line 72 and the line 155 which is in communication with the clutch 153 of the open differential 152 of the axle 151.

Similarly, the controller 16 may send a signal to the solenoid 257 of the second rear axle differential clutch pilot valve 256 thereby shifting the spool 258 downward against the bias of the biasing element 265 thereby providing communication between the pressurized fluid line 73 and the hydraulic actuator 262 of the second rear axle differential clutch control valve 263. This action shifts the spool 264 downward against the bias of the biasing element 266 thereby providing communication between the pressurized fluid line 73 and the line 255 which is in communication with the clutch 253 of the open differential 252 of the second rear axle 251.

While the antilock brake system 11 of FIG. 1 illustrates the use of two pumps 38, 71, only a single pump may be necessary and, further, while two accumulators 39, 68 are shown, only a single accumulator may be necessary. However, it may also be beneficial to pressurize the clutches 53, 153, 253 at a different pressure than the brakes 36, 37, 136, 137, 236, 237. Hence, the reservoirs 75, 76 may be separate or combined as a single reservoir.

Figure 2:
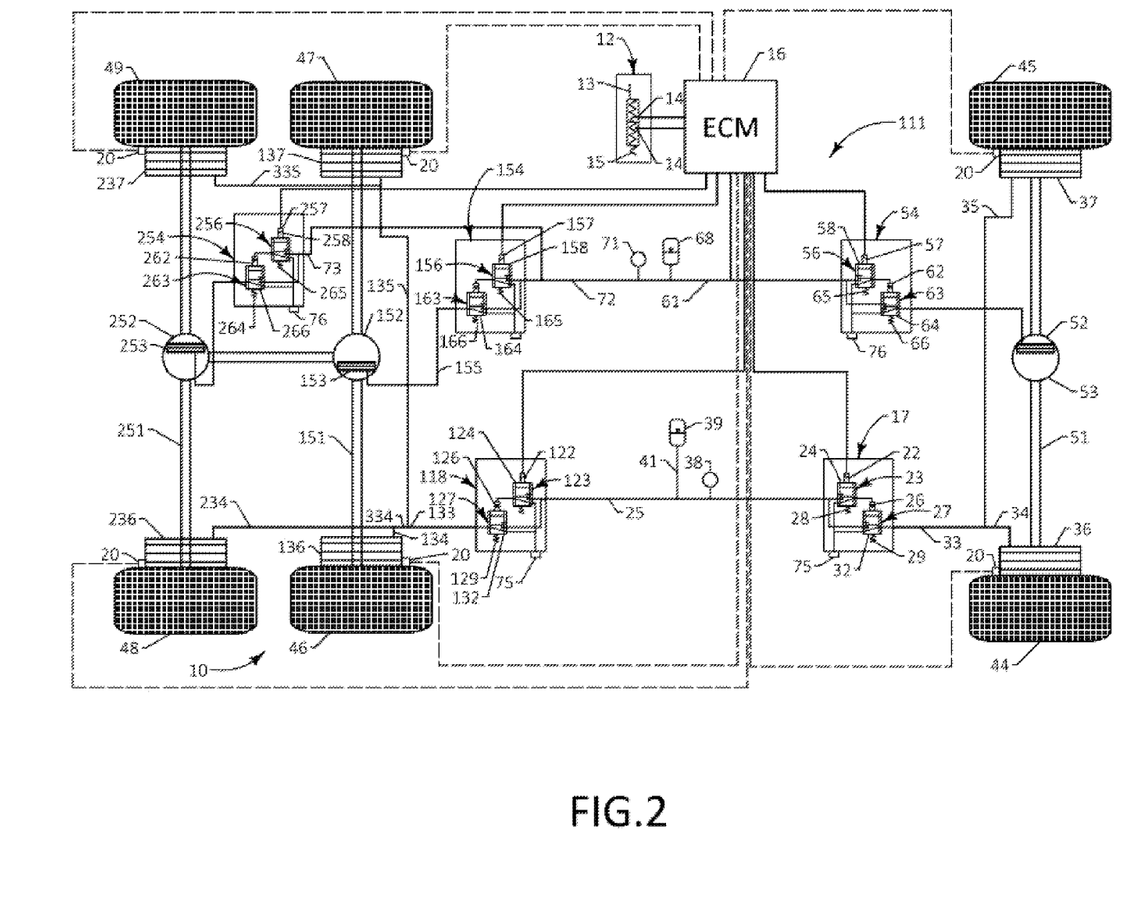
FIG. 2 schematically illustrates another disclosed electrohydraulic antilock braking system installed on a vehicle with differentials on each of the three axles, clutch control valves for each clutch of each differential, a front brake control valve for the wheels of the front axle and a single rear brake control valve for wheels of both rear axles.
Figure 3:
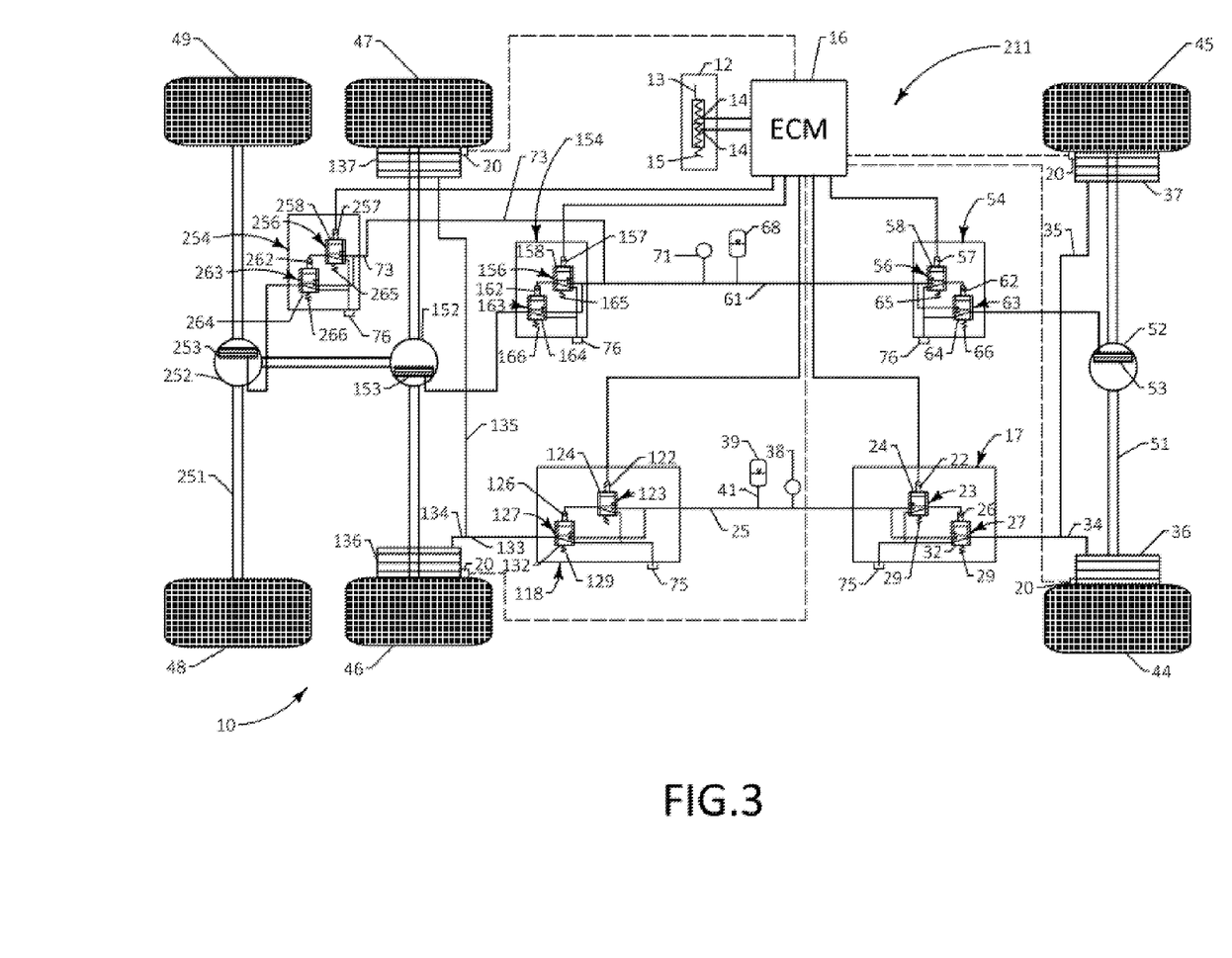
FIG. 3 schematically illustrates another disclosed electrohydraulic antilock braking system installed on a vehicle with differentials on each of the three axles, clutch control valves for each clutch of each differential, a front brake control valve for the wheels of the front axle and a rear brake control valve for the wheels of one of the two rear axles.
Figure 4:
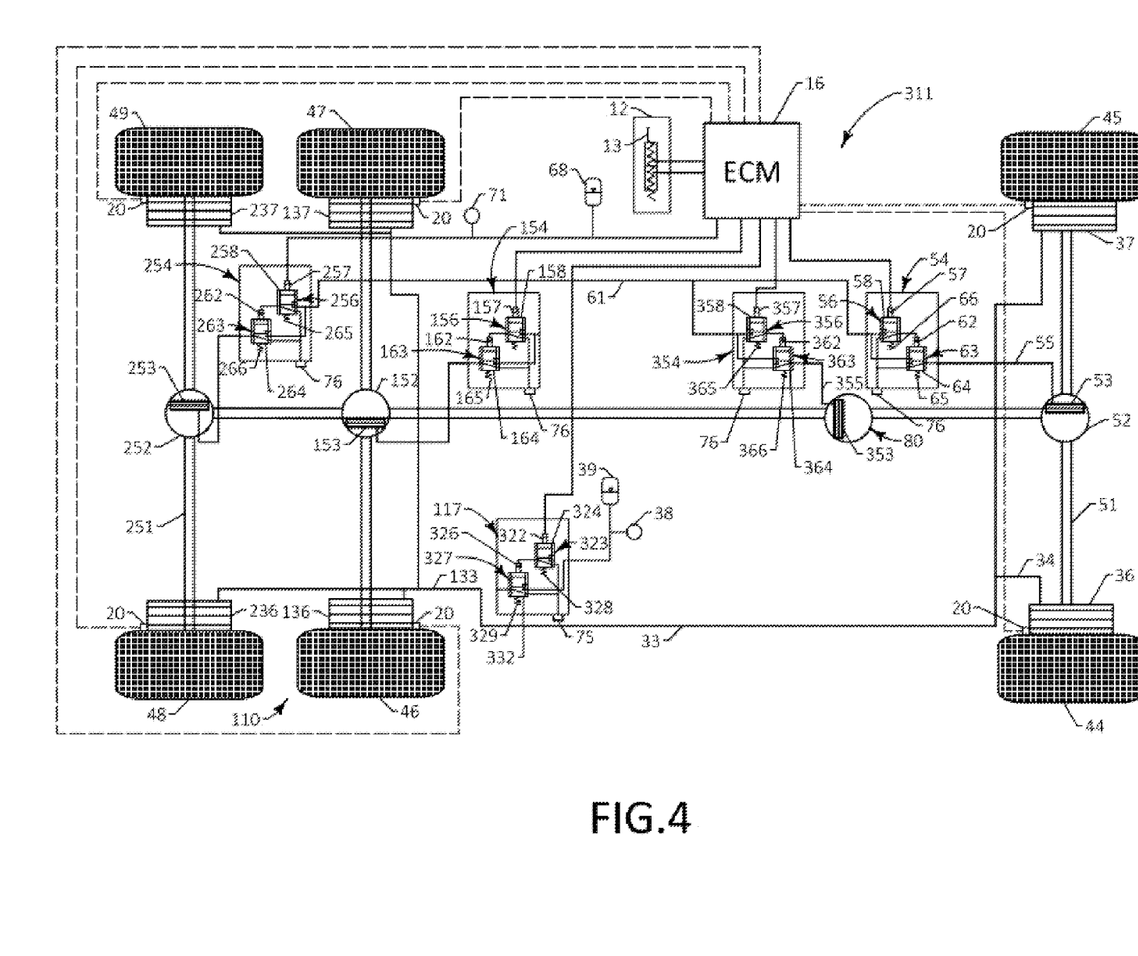
FIG. 4 schematically illustrates yet another disclosed electrohydraulic antilock braking system installed on the vehicle with differentials on each of the three axles, a differential on the inter-axle drive shaft, clutch control valves for each clutch of each differential and a single brake control valve for wheels of all three axles, i.e. all six wheels.

For purposes of brevity, FIGS. 2-3 will illustrate the incorporation of two additional antilock brake systems 111, 211 on an equivalent articulated vehicle 10 and FIG. 4 will illustrate the incorporation of a fourth antilock brake system on a slightly modified articulated vehicle 110 that includes an inter-axle differential 80. The reference numerals of FIG. 1 will also be used for like or similar parts in describing the variations presented in FIGS. 2-4.

Turning to FIG. 2, the primary difference between the antilock brake system 111 of FIG. 2 and the antilock brake system 11 of FIG. 1 is the use of a single rear brake valve assembly 118 for controlling the flow of hydraulic fluid to all four rear brakes 136, 137, 236, 237 of all four rear wheels 46, 47, 48, 49. The rear brake valve assembly 118 includes the same components as the first rear brake valve assembly 18 (and second rear brake valve assembly 19). Like the antilock brake system 11 of FIG. 1, the rear brake valve assembly 118 includes a rear brake pilot valve 123 with a solenoid 122 that may be linked to the controller 16. Upon receiving a signal from the controller 16, the solenoid 122 forces the spool 124 downward thereby providing communication between a pressurized fluid line 25 and the hydraulic actuator 126 of the rear brake control valve 127. Upon opening of the rear brake control valve 127, pressurized fluid is communicated through the rear brake fluid line 133 that is in communication with the first right rear brake fluid line 134 and the second right rear brake fluid line 234 via the connecting line 334. Similarly, the rear brake fluid line 133 is also in communication with a first left rear brake fluid line 135 that is also in communication with a second left rear brake fluid line 335 as shown in FIG. 2. Thus, fluid exiting the rear brake valve assembly 118 through the rear brake fluid line 133 is communicated to all four rear brakes 136, 137, 236, 237. The remaining elements of the antilock brake system 111 shown in FIG. 2 are at least substantially equivalent to the elements or components of the antilock brake system 11 shown in FIG. 1 and therefore the description thereof will not be repeated here.

Turning to FIG. 3, another antilock brake system 211 is installed on the vehicle 10, however, the brakes on the rear most wheels 48, 49 have been removed, just leaving the second rear open differential 252 and second rear clutch 253. Like the antilock brake system 111 of FIG. 2, the antilock brake system 211 is a dual circuit system employing front and rear brake valve assemblies 17, 118 respectively. Like the antilock brake system 111 of FIG. 2 and the antilock brake system 11 of FIG. 1, three axle differential control valve assemblies 54, 154, 254 are employed.

Finally, FIG. 4 illustrates another antilock brake system 311 that includes a single brake valve assembly 117 that supplies pressurized fluid to all six brakes 36, 37, 136, 137, 236, 237. The single brake valve assembly 117 includes a pilot valve 323 having a solenoid 322 that may be linked to the controller 311. Upon receiving a signal from the controller 16, the solenoid urges the spool 322 downward in the orientation of FIG. 4 against the biasing element 328 thereby providing communication from the pressurized fluid line 25 to the hydraulic actuator 326 of the brake control valve 327. The hydraulic actuator 326 urges the spool 332 downward against the bias of the biasing element 329 thereby providing communication from the pressurized fluid line to the front brake fluid line 33 and the rear brake fluid line 133.

Further, an additional inter-axle differential control valve assembly 354 is included to control the clutch 353 of the inter-axle open differential 80. Like the other axle differential control valve assemblies 54, 154 and 254, the inter-axle differential control valve assembly includes an inter-axle differential clutch pilot valve 356 with a solenoid 357 linked to the controller 16. Upon receiving a signal from the controller 16, the solenoid 357 urges the spool 358 downward in the orientation of FIG. 4 against the biasing element 365 thereby providing communication from the pressurized fluid line 61 to the hydraulic actuator 362 of the inter-axle differential clutch control valve 363. The hydraulic actuator 362 urges the spool 364 downward against the bias of the biasing element 366 thereby providing communication from the pressurized fluid line 61 through the inter-axle differential clutch control valve 363 through the line 355 to the clutch 353. The inter-axle clutch 353 can transmit torque between the front brakes 36, 37 and the rear brakes 136, 137 and 236, 237.

INDUSTRIAL APPLICABILITY

Figure 5:
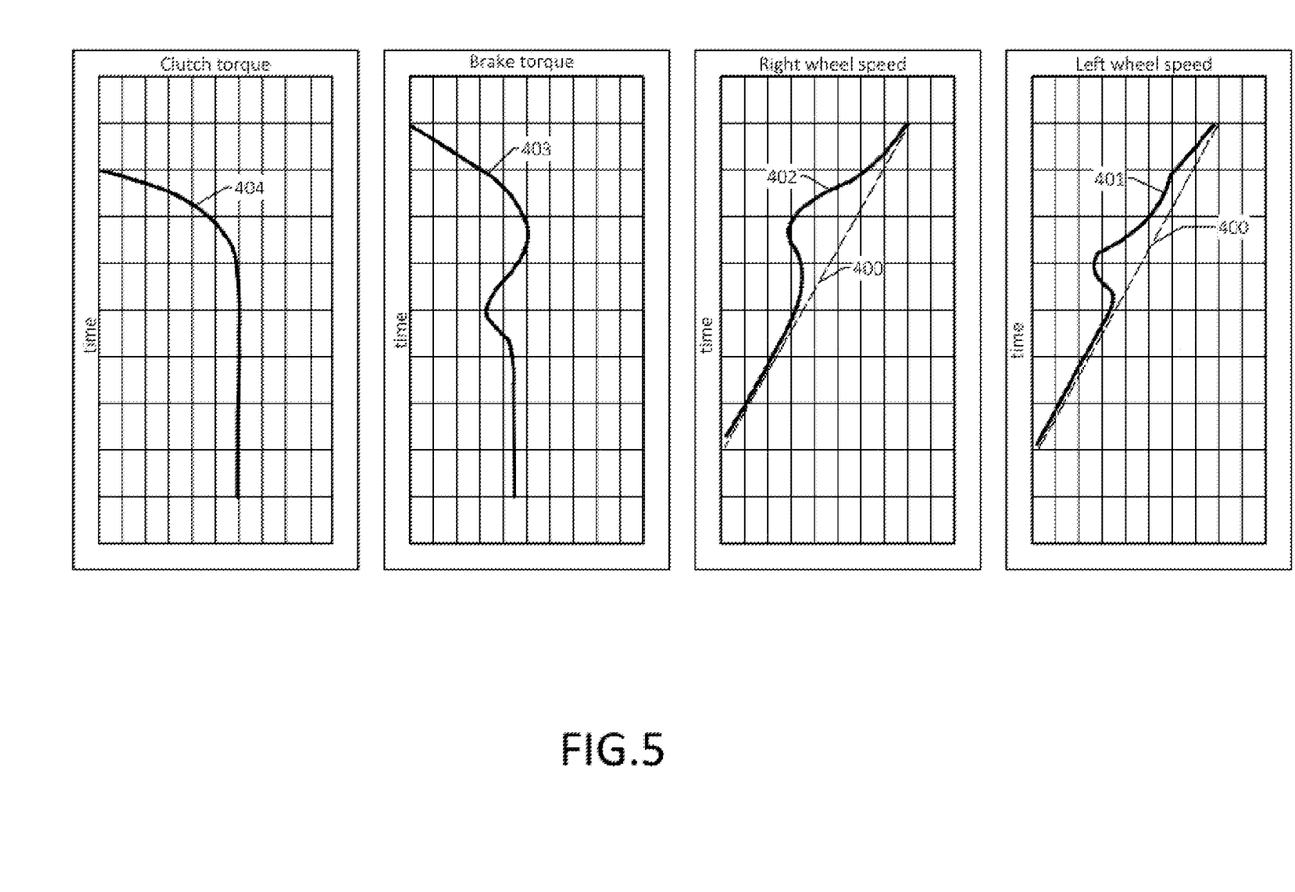
FIG. 5 graphically illustrates the performance of the disclosed electrohydraulic antilock braking systems, especially the application of clutch torque to transfer excess brake torque from the right wheel to the left wheel and the reduction of brake pressure to restore both wheels to a desired speed thereby maintaining directional control and an effective stopping distance.

Turning to FIG. 5, the ability of the disclosed antilock brake systems 11, 111, 211, 311 to transfer brake torque from one wheel to another wheel on the same axle is graphically illustrated. The phantom lines 400 in the top two graphs of FIG. 5 illustrate the machine speed as the brakes are applied. Referring to the graph at the far right of FIG. 5, the left wheel speed represented by the line 401 is slowing at a faster rate than the vehicle 400. However, referring to the graph illustrating the right wheel speed, it is apparent that the right wheel speed represented by the line 402 is decreasing at even a faster rate. The controller 16 sees that the wheel speed 402 drops significantly and intervenes to correct the situation. The controller 16 recognizes that there is a significant difference between the left and right wheel speeds 401, 402 and so it increases the clutch torque 404. It does not immediately reduce the brake torque 403 since the controller 16 recognizes that, while left speed 401 has dropped somewhat, lockup is not yet imminent. In this particular situation, the brake control algorithm of the controller 16 is programmed to effectively ignore the lower of the two wheel speeds 401 or 402. The action of increasing the clutch torque 404 does have the desired effect of increasing the right wheel speed 402 and so ultimately avoiding potential lockup situations. However, as the brake torque is in effect transferred from right to left, it also has the effect of temporarily reducing the left wheel speed 401. As a result, both left and right speeds 401, 402 are both temporarily low and cause the controller 16 to briefly activate a moderate brake torque 403 reduction as shown in the third graph. There are many different possible scenarios but, in all cases, the combination of brake and clutch torque 403, 404 keeps both wheels rotating and allows the appropriate brake torque 403 to be applied to each wheel. Hence, referring to the clutch torque graph of FIG. 5, the clutch torque represented by the line 404 increases as the brake torque 403 increases and transfers torque from the right wheel 44 to the left wheel 45 as evidenced by the right wheel speed 402 approaching to the vehicle speed 400. Contemporaneously, the left wheel speed 401 drops below the vehicle speed 400 so the system reduces the brake torque and the left wheel speed 401 begins to equalize with the vehicle speed 400.

Thus, FIG. 5 illustrates a situation where the right wheel 44 was approaching a lockup condition and the left wheel 45 was also traveling more slowly than the vehicle 10. This is caused by the operator applying excessive brake torque as evidenced by the brake torque graph of FIG. 5. To prevent the right wheel 44 from locking up, the controller applies clutch torque which transfers torque from the right wheel 44 to the left wheel 45 which causes the left wheel 45 to slow down relative to the vehicle before the speeds of both wheels 44, 45 begin to equalize with the speed of the vehicle 10.

Thus, antilock braking systems 11, 111, 211, 311 are disclosed that include a controller 16 that can control the amount of brake torque applied to the wheels 44-49 through the various brake valve assemblies 17, 18, 117, 118 and which can further transfer brake torque from one wheel of an axle to another wheel of an axle through the open differential clutches 53, 153, 253 and the axle differential control valve assemblies 54, 154, 254. Finally, brake torque can be transferred from the rear of the vehicle 10, 110 to the front of the vehicle 10, 110 and vice versa. An inter-axle differential valve assembly 354 is included.

What is claimed:

1. An antilock brake system for a vehicle having a front axle with right and left front brakes and a first rear axle with first right and left rear brakes, the front axle including a front differential with a front clutch, the first rear axle including a first rear differential with a first rear clutch, the system comprising:
   a controller linked to a front axle differential clutch valve assembly, a first rear axle differential clutch valve assembly and a brake valve assembly;
   the brake valve assembly being in communication with the right and left front brakes and the right and left rear brakes, the front axle differential clutch valve assembly being in communication with the front clutch, the first rear axle differential clutch valve assembly being in communication with the first rear clutch;
   the brake valve assembly, front axle differential clutch valve assembly and first rear axle differential clutch valve assembly being in communication with a source of pressurized hydraulic fluid; and
   at least one pilot control valve being operatively associated with one of the brake valve assembly, the front axle differential clutch assembly or the first rear axle differential clutch valve assembly.

2. The antilock brake system of claim 1 wherein the vehicle further includes a second rear axle that includes a second rear differential with a second rear clutch, the antilock brake system further including a second rear axle differential clutch valve assembly that is linked to the controller, the second rear axle differential clutch valve assembly being in communication with the second rear clutch.

3. The antilock brake system of claim 2 wherein the front, first rear and second rear differentials are connected by a drive shaft, the drive shaft including a drive shaft differential that includes a drive shaft clutch, the antilock brake system further including a drive shaft differential clutch valve assembly that is linked to the controller and that is in communication with the drive shaft clutch.

4. The antilock brake system of claim 3 wherein the front, first rear and second rear differentials are connected by a drive shaft, the drive shaft including a drive shaft differential that includes a drive shaft clutch, the antilock brake system further including a drive shaft differential clutch valve assembly including a drive shaft differential pilot valve having an actuator that is linked to the controller, the drive shaft differential pilot valve being in communication with a drive shaft differential control valve that is in communication with the drive shaft clutch.

5. The antilock brake system of claim 2 wherein the at least one pilot control valve includes, at least, a second rear axle differential clutch pilot valve having an actuator that is linked to the controller, the second rear axle differential clutch pilot valve being in communication with a second rear axle differential clutch control valve, the second rear axle differential clutch control valve being in communication with the second rear clutch.

6. The antilock brake system of claim 2 wherein the second rear axle includes second right and left rear brakes, the brake valve assembly being in communication with the second right and left rear brakes.

7. The antilock brake system of claim 1 wherein the at least one pilot control valve includes, at least:
  a front brake pilot valve that includes an actuator that is linked to the controller, the front brake pilot valve being in communication with a front brake control valve, the front brake control valve being in communication with the right and left front brakes; and
  a first rear brake pilot valve that includes an actuator that is linked to the controller, the first rear brake pilot valve being in communication with a first rear brake control valve, the first rear brake control valve being in communication with the first right and left rear brakes.

8. The antilock brake system of claim 7 wherein the vehicle further includes a second rear axle that includes second right and left rear brakes, the brake valve assembly further including a second rear brake pilot valve that includes an actuator that is linked to the controller, the second rear brake pilot valve being in communication with a second rear brake control valve, the second rear brake control valve being in communication with the second right and left rear brakes.

9. The antilock brake system of claim 1 wherein the front and first rear differentials are connected by a drive shaft, the drive shaft including a drive shaft differential that includes a drive shaft clutch, the antilock brake system further including a drive shaft differential clutch valve assembly that is linked to the controller and that is in communication with the drive shaft clutch.

10. The antilock brake system of claim 9 wherein the front and first rear differentials are connected by a drive shaft, the drive shaft including a drive shaft differential that includes a drive shaft clutch, the antilock brake system further including a drive shaft differential clutch valve assembly including a drive shaft differential pilot valve having an actuator that is linked to the controller, the drive shaft differential pilot valve being in communication with a drive shaft differential control valve that is in communication with the drive shaft clutch.

11. The antilock brake system of claim 1 wherein the at least one pilot control valve includes, at least, a front axle differential clutch pilot valve having an actuator that is linked to the controller, the front axle differential clutch pilot valve being in communication with a front axle differential clutch control valve, the front axle differential clutch control valve being in communication with the front clutch.

12. The antilock brake system of claim 1 wherein the at least one pilot control valve includes, at least, a first rear axle differential clutch pilot valve having an actuator that is linked to the controller, the first rear axle differential clutch pilot valve being in communication with a first rear axle differential clutch control valve, the first rear axle differential clutch control valve being in communication with the first rear clutch.

13. An antilock brake system for a vehicle having a front axle with right and left front brakes and a first rear axle with first right and left rear brakes, the front axle including a front differential with a front clutch, the first rear axle including a first rear differential with a first rear clutch, the system comprising:
  a controller linked to an actuator of a first brake pilot valve, an actuator of a front axle differential clutch pilot valve, and an actuator of a first rear axle differential clutch pilot valve;
  the first brake pilot valve being communication with an actuator of a first brake control valve, the front axle differential clutch pilot valve being communication with an actuator of a front axle differential clutch control valve, the first rear axle differential clutch pilot valve being in communication with an actuator of a first rear axle differential clutch control valve;
  the first brake control valve being in communication with the right and left front brakes and, optionally, the right and left rear brakes, the front axle differential clutch control valve being in communication with the front clutch, the first rear axle differential clutch control valve being in communication with the first rear clutch;
  the first brake pilot valve, first brake control valve, front axle differential clutch pilot valve, front axle differential clutch control valve, first rear axle differential clutch pilot valve and first rear axle differential clutch control valve being in communication with a source of pressurized hydraulic fluid.

14. The antilock brake system of claim 13 wherein the first brake control valve is in communication with the first right and left rear brakes.

15. The antilock brake system of claim 13 further including a second brake pilot valve having an actuator in communication with the controller, the second brake pilot valve being in communication with a second brake control valve, wherein the second brake control valve is in communication with the right and left rear brakes.

16. The antilock brake system of claim 13 wherein the vehicle further includes a second rear axle that includes a second rear differential with a second rear clutch, the antilock brake system further including a second rear axle differential clutch pilot valve having an actuator linked to the controller, the second rear axle differential clutch pilot valve being in communication with an actuator of a second rear axle differential clutch control valve that is in communication with the second rear clutch.

17. The antilock brake system of claim 16 wherein the second rear axle includes second right and left rear brakes, the first brake control valve being in communication with the second right and left rear brakes.

18. The antilock brake system of claim 16 wherein the vehicle further includes a third brake pilot valve having an actuator in communication with the controller, the third brake pilot valve being in communication with a third brake control valve, wherein the third brake control valve is in communication with the second right and left rear brakes.

19. The antilock brake system of claim 13 wherein the front and rear differentials are connected by a drive shaft, the drive shaft including a drive shaft differential that includes a drive shaft clutch, the antilock brake system further including a drive shaft differential clutch pilot valve having an actuator linked to the controller, the drive shaft differential clutch pilot valve being in communication with an actuator of a drive shaft differential clutch control valve that is in communication with the drive shaft clutch.

20. A method of braking a vehicle, comprising:
sending a brake signal to a controller;
sending a signal from the controller to a brake valve assembly to provide communication from a pressurized fluid reservoir through the brake valve assembly to right and left brakes of at least one axle;
sending pressurized fluid from the reservoir to the right and left brakes;
wherein if one of the brakes is closer to a locked condition then the other brake,
sending a signal from the controller to the brake valve assembly to reduce communication from the reservoir to the brakes, and
sending a signal from the controller to an axle differential clutch valve assembly to provide communication from the reservoir to a clutch of an axle differential, the axle differential clutch valve assembly including, at least, an axle differential clutch pilot valve having an actuator, the axle differential clutch pilot valve being in communication with a front axle differential clutch control valve, and transmitting torque from the brake that is closer to the locked condition to the other brake.

* * * * *